Feb. 26, 1952
C. PAGE
2,586,988
ARTICLE DISTRIBUTING MACHINE
Filed March 13, 1947
2 SHEETS—SHEET 1
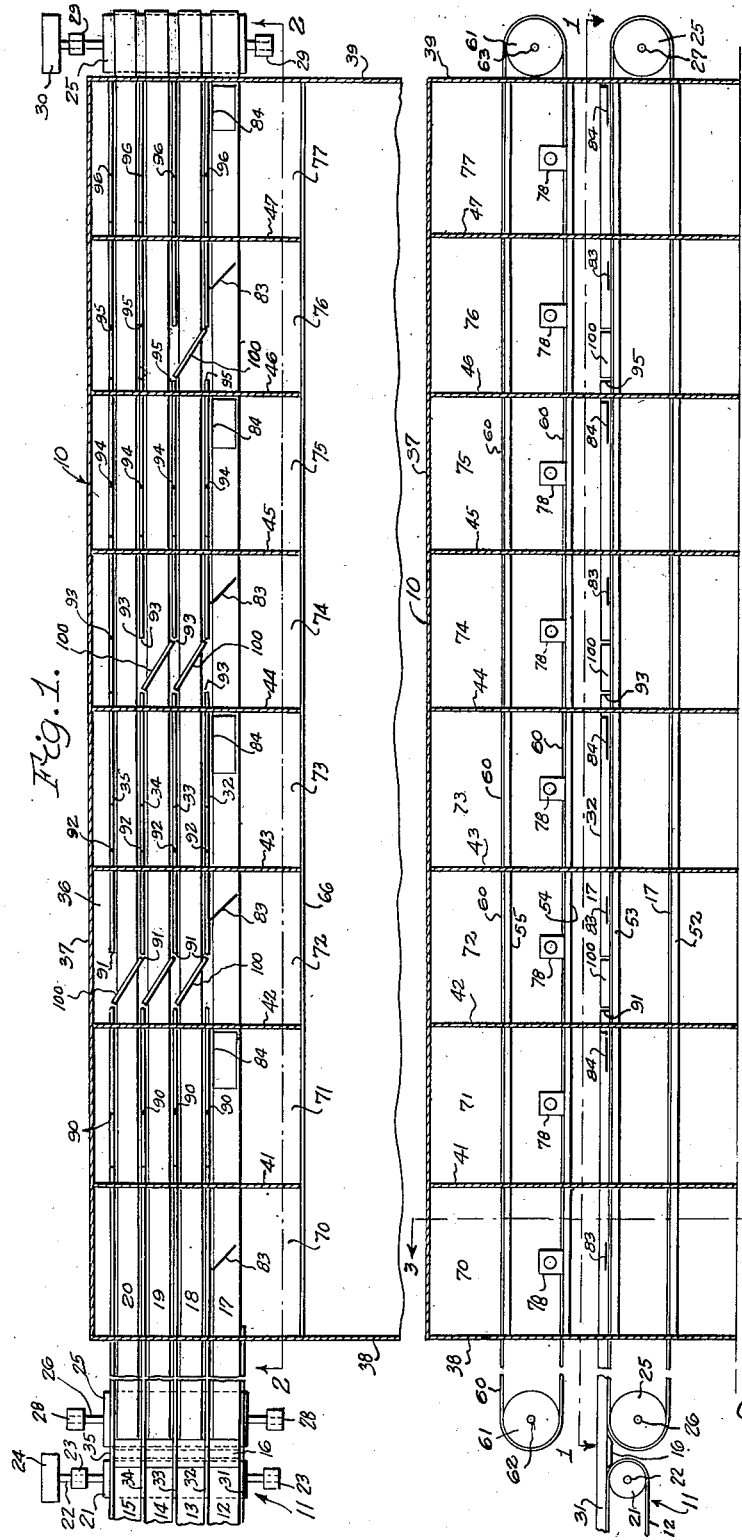
Inventor
Clarence Page
Barthel & Bugbee
Attorneys.

Feb. 26, 1952          C. PAGE          2,586,988
ARTICLE DISTRIBUTING MACHINE
Filed March 13, 1947                    2 SHEETS—SHEET 2
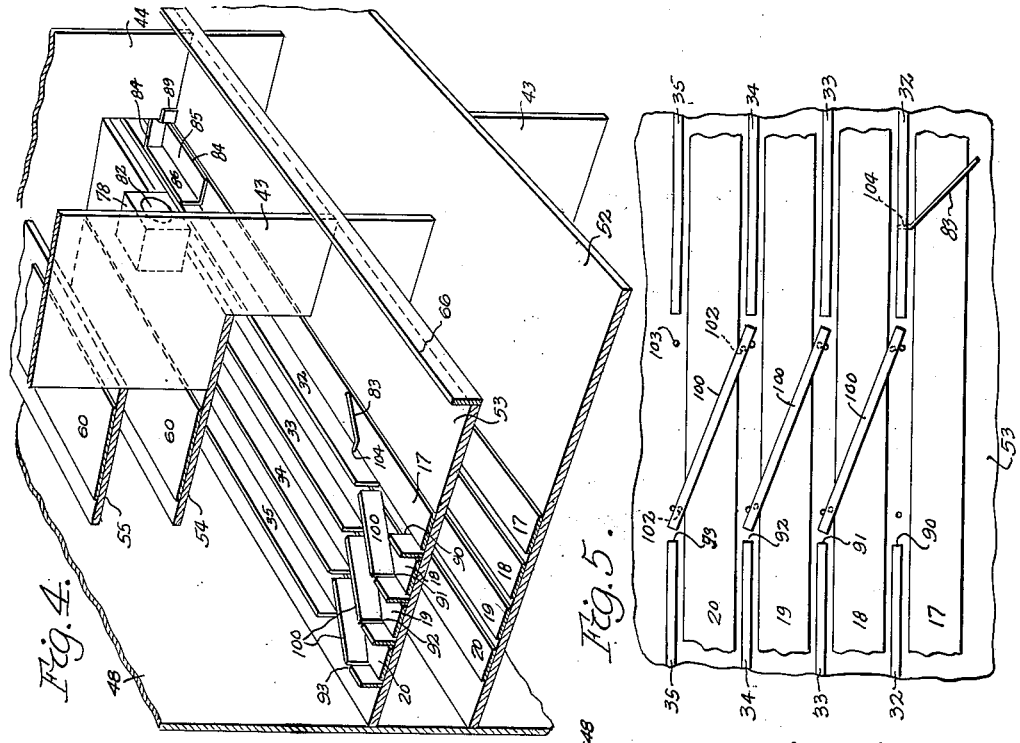
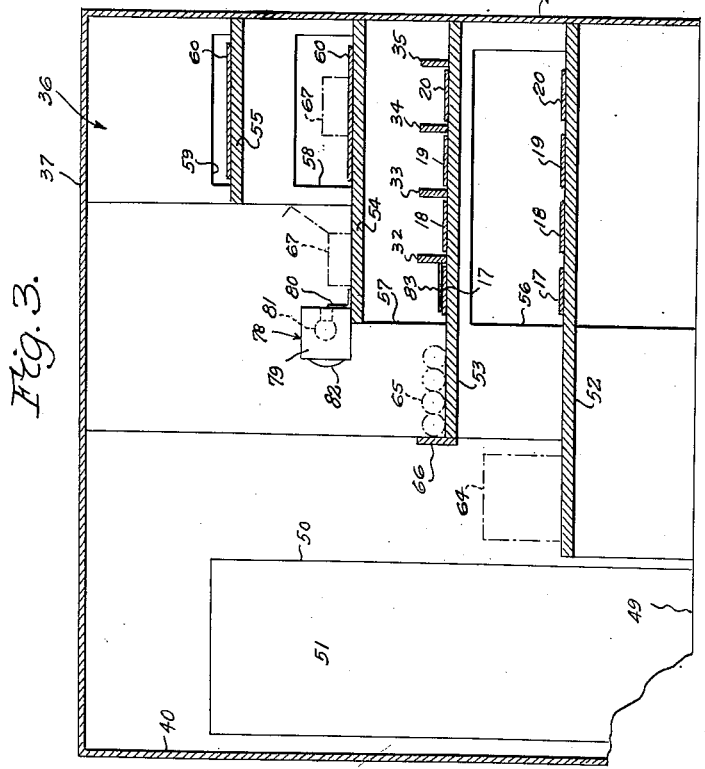
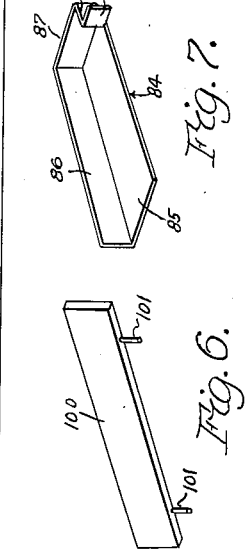
Inventor
Clarence Page
Barthel & Bugbee
Attorneys Patented Feb. 26, 1952

2,586,988

UNITED STATES PATENT OFFICE 2,586,988

ARTICLE DISTRIBUTING MACHINE

Clarence Page, Detroit, Mich., assignor to Page and Cox, Detroit, Mich., a corporation of Michigan Application March 13, 1947, Serial No. 734,403

6 Claims. (Cl. 198—42)

This invention relates to article distributors, and in particular to distributors for distributing round or partially round articles rollable, such as eggs, fruit, vegetables or the like.

One object of this invention is to provide an article distributor for rollable articles which will remove such articles from a plurality of moving conveyors carrying articles of different grades and which will deposit the articles at certain stations without mixing articles of different grades at any station.

Another object is to provide an article distributor for rollable articles as set forth in the preceding object, wherein the stations are located along a straight-line path adjacent one of the conveyors.

Another object is to provide an article distributor for rollable articles, as set forth in the preceding objects, wherein the conveyors are mounted side by side and the stations at which the articles are to be deposited according to their grades are located in succession along the side of one of the conveyors.

Another object is to provide an article distributor for rollable articles, as set forth in the preceding objects, wherein a plurality of deflectors are provided for deflecting the objects from one conveyor to another after each conveyor has been freed from the grade of articles it was previously carrying, so that each of the stations at which the articles are deposited will be given only one grade of article.

Another object is to provide an article distributor for rollable articles wherein means is provided for automatically permitting the articles to proceed to a subsequent station when a given station is temporarily filled with the articles.

Another object is to provide an article distributor for rollable articles, as set forth in the preceding objects, wherein the articles are first removed from the conveyor nearest the receiving stations, after which the articles on the farther conveyors are successively moved to nearer conveyors and the articles on the nearest conveyor removed to subsequent receiving stations until all of the articles have been removed to groups of receiving stations, each group being allotted articles of a single grade only.

Other objects and advantages of the invention will become apparent during the course of the following description of the accompanying drawings, wherein:

Figure 1 is a horizontal section through an article distributor according to a preferred form of the invention, taken along the line 1—1 in Figure 2 and showing the article conveyors and deflectors;

Figure 2 is a vertical section in a vertical plane passing through the article receiving stations, taken along the line 2—2 in Figure 1;

Figure 3 is a vertical cross-section through the article distributor shown in Figures 1 and 2 and taken along the line 3—3 in Figure 2;

Figure 4 is a perspective view of the third article receiving station from the left side of Figure 1 and the adjacent conveyors and article deflectors, partly broken away to disclose the construction thereof;

Figure 5 is an enlarged fragmentary top plan view of the article deflectors and conveyors shown in Figure 4;

Figure 6 is a perspective view of one of the article deflectors shown in Figure 5, removed from the machine; and Figure 7 is a perspective view of one of the article stops shown in Figures 1, 2 and 4 for preventing the conveying of articles beyond a selected receiving station.

Referring to the drawings in detail, Figure 1 shows an article distributor generally designated 10 for receiving and distributing rollable articles from a machine 11 having endless conveyors 12, 13, 14 and 15 which convey the rollable articles to a bridge 16 across which they are pushed by subsequently arriving articles and are further conveyed upon endless conveyors 17, 18, 19 and 20 forming a part of the article distributor 10. The conveyors 12, 13, 14 and 15 may consist of belts supported upon pulleys or drums 21 mounted upon shafts 22, only one such shaft being shown. The shaft 22 is journaled in bearing blocks 23 and carries a pulley 24 by which it is rotated from an external source of power such as a motor (not shown). The machine 11 may consist for example, of an egg-grading machine such as is disclosed and claimed in my co-pending application, Serial No. 718,755, filed December 27, 1946 and now Patent No. 2,481,440 granted September 6, 1949, for Egg-Grading Machine. In such a machine, the rollable articles, such as eggs, are graded into a plurality of classes, four being shown, according to their weight ranges, each of the conveyors 12, 13, 14 and 15 carrying articles of a different weight range or grade.

The conveyors 17, 18, 19 and 20 are similarly mounted upon drums or pulleys 25 carried by shafts 26 and 27 at opposite ends of the machine. The shafts 26 and 27 are journaled in bearing blocks 28 and 29 respectively, and the shaft 27 like the shaft 22 carries a pulley 30 by which it is driven from an external source of power such as a motor (not shown). The conveyors 12 to 15 and 17 to 20 inclusive are divided from one another by elongated bars or separators 31, 32, 33, 34 and 35 so that articles on one conveyor cannot roll over to another conveyor. The separator 31 is relatively short, but the remaining separators run the entire length of the machine 10.

The machine 10 is provided with a roomlike housing generally designated 36 having a top wall 37, opposite end walls 38 and 39, a front wall 40 and vertical partition walls 41 to 47 inclusive extending from the floor level to the top wall 37 but projecting from the rear wall 48 only partway across the space inside the housing 36 so as to leave a corridor 49 (Figure 1) between the partition walls and the front wall 40. The end walls 38 and 39 are provided with suitable door openings 50 (Figure 3) closed by doors 51 (one only being shown). In this manner, the housing 36 is made light-tight so that it is substantially a dark room for excluding undesired light and for permitting only the light desired for article inspection purposes.

The housing 36 is also provided with a series of horizontal shelf-like walls 52, 53, 54 and 55 (Figures 3 and 4) which decrease progressively in width from the lowermost to the uppermost thereof. The end walls 38 and 39 and the partition walls 41 to 47 inclusive are provided with aligned openings 56, 57, 58 and 59. The upper and lower courses or runs of the endless conveyors 17 to 20 inclusive rest upon the wall-like shelves 52 and 53 and pass through the openings 56 and 57. The separators 31 to 35 inclusive likewise rest upon the wall 53 (Figure 3) and, as previously stated, separate the various conveyors from one another. The two uppermost walls 54 and 55 support the lower and upper courses of an endless conveyor 60 which passes through the openings 58 and 59 and is supported at its opposite end upon pulleys or drums 61 (Figure 2) mounted upon shafts 62 and 63 which are journaled in any suitable bearings (not shown) and driven in a manner analogous to the shafts 26 and 27.

The lowermost shelf 52 is used not only to support the lower runs or courses of the conveyors 17 to 20 inclusive, but also as a rest for cases or boxes 64 or the like into which the rollable articles 65, such as eggs, fruit or vegetables are packed after being distributed and inspected. When the articles are so packed, such as bulk eggs packed in cases, the latter may then be pushed rearward onto the lower courses of the conveyor belts 17 to 20 and carried away to a disposal point outside the machine. Rejected eggs or other articles may be similarly packed and disposed of. The shelf 53 is provided with a ledge 66 along its front edge (Figure 3) which prevents the articles 65 from rolling off after they have been deposited thereon. The shelf 54, in addition to supporting the lower run or course of the conveyor 60, likewise serves to hold cartons 67 when it is desired to pack small quantities of the eggs or other distributed and inspected articles, after which the cartons are placed upon the conveyor 60 and conveyed to an external location for shipment.

The vertical walls 38, 39, and 41 to 47 inclusive serve to divide up the rearward portion of the housing 36 into a plurality of article receptacles in the form of booths or receiving stations 70 to 77 inclusive, and each booth is provided with an inspection light 78 consisting of a casing 79 secured by the bracket 80 to the shelf 54 and having a light source 81, such as an electric light bulb, and a transparent or translucent window 82 of any suitable material, such as milk glass. Obviously, any number of booths 70 to 77 inclusive may be provided according to the requirements of the task, eight being shown merely for purposes of illustration.

The separator 32 in each booth is provided with holes 104 to receive angularly directed article removers or deflectors 83, four only being shown (Figure 4). These consist of rod-like members mounted in and projecting outward from the separator 32 at a distance just above the surface of the conveyor 17. Booths not having the article removers 83 are provided with insertable and removable box-like article stops 84 (Figures 4 and 7). Each article stop 84 has a bottom wall 85 adapted to rest upon the conveyor 17, a rear side wall 86 and an end wall 87 having an L-shaped hook-like portion 88, 89 projecting forwardly and laterally therefrom. The portion 89 engages one of the partition walls 41 to 47 inclusive or the end wall 39 adjacent one of the openings 57 and prevents the article stop 84 from being carried along the conveyor 17.

The separators 32 to 35 in each booth except booth 70 are provided at intervals with gaps 90 to 96 inclusive (Figure 1) in which are mounted article removers 100 (Figures 1, 4, 5 and 6) extending from gap to gap. The article removers or deflectors 100 serve as transfer members to deflect and transfer the rollable articles 65 from one to another of the conveyors 17 to 20 inclusive, cooperating with the article removers 83 until all of the articles have been deposited in one or another of the booths 70 to 77 inclusive on the shelf 53. The article removers 100 are provided with pins 101 (Figure 6) extending downward from the lower edge thereof so as to facilitate their being mounted in corresponding holes 102 in the shelf 53. Holes 103 (Figure 5) are also provided in each gap in the separators 32 to 35 inclusive so that the article removers 100 may be lifted out of the holes 102 and transferred to the holes 103, in order to change them from their oblique positions shown in Figures 1, 4 and 5 to positions co-extensive with the separators 32 to 35 inclusive and closing the gaps therein. Thus any number of booths may be allocated to a given grade of article merely by properly positioning the stops 84 and deflectors 100 either to close the gaps or to extend across the conveyors. Thus, if at a given time the articles, such as eggs, are running predominantly in one grade, several booths are allocated to that grade and a smaller number to the other grades. The machine thus has great flexibility to meet varying conditions.

In the operation of the invention, with the various parts arranged as shown in the figures, eggs or other rollable articles of different grades are fed by the conveyors 12 to 15 inclusive to the conveyors 17 to 20 inclusive. Let it be assumed, solely for purposes of illustration, that two booths have been allocated to each grade of egg, and that the article removers 83 and 100 and stops 84 have been so arranged to accomplish this, as shown in Figures 1 and 2. As the first grade articles on the conveyor 17 encounter the first article remover 83 in the booth 70 (Figure 5), they are caused to roll off the conveyor 17 onto the shelf 53 and up against the ledge 66. When the receiving space in the booth 70 is filled with one layer of the articles 65, subsequent articles, being thereby prevented from entering this space, are pushed over the article remover 83 and carried through the opening 57 into the next booth 71. Here the articles are prevented from traveling further by the end wall 87 of the stop 84. The stops 84 serve to take the pressure off the eggs since a much shorter line of eggs is in contact with the moving belt.

Immediately beyond the partition wall 42, the articles on the conveyors 18, 19 and 20 encounter the article removers 100 in the gaps 90 to 93 inclusive and are deflected into the conveyors 19, 18 and 17 in the order named (Figure 1).

The second grade articles, such as eggs which previously occupied the conveyors 13 and 18 thus pass to the first conveyor 17 from which all eggs of the first grade have by now been removed. The article remover 83 in the booth 72 and the article stop 84 in the booth 73 now operate in the same manner to remove the second grade of rollable article 65 from the conveyor 17.

The articles remaining on the conveyors 19 and 18 pass through the openings 57 in the partition wall 44 and immediately encounter the article removers 100 in the gaps 94, 95 and 96. The articles 65 are then caused to shift over laterally as before, the third grade articles originally on the conveyors 14 and 19 being deposited in the booths 74 and 75 by the article remove 83 or article stop 84 therein. The fourth grade articles, however, now occupy the conveyor 18, on which they pass through the opening 57 in the partition wall 46 and are deflected by the article remover 100 in the gap 98 to the conveyor 17 within the booths 76 and 77, the remaining articles being removed therefrom either by the article remover 83 in the booth 76 or by the article stop 84 in the both 77.

Thus, by the machine of this invention, several grades of articles 65, on several conveyors which may be more or less than the four grades occupying the four conveyors 17, 18, 19 and 20, are distributed to several groups of booths including one or more booths to each group. The operators in each of these groups pick the articles 65 off the shelf 63, inspect them briefly in front of the inspection window 82 of the inspection light 78. The accepted articles, such as eggs, are placed in the cartons 67, which when filled, are pushed rearward onto the lower course of the conveyor 60 to be conveyed to a location outside the housing 36 for shipment or other disposal.

What I claim is:

1. A distributing machine for rollable articles comprising a supporting structure, a plurality of parallel conveyors mounted on said structure, a series of article receptacles disposed in succession alongside one of said conveyors, separators arranged between said conveyors and having gaps at intervals therein, and article removers arranged across said conveyors at said gaps and directed toward said receptacles, the gaps in certain of said separators being positioned approximately in transverse alignment with one another on opposite sides of the conveyor running therebetween.

2. A distributing machine for rollable articles comprising a supporting structure, a plurality of parallel conveyors mounted on said structure, a series of article receptacles disposed in succession alongside one of said conveyors, and article removers arranged across said conveyors and directed toward said receptacles, certain of said article removers being arranged across the conveyor nearest said article receptacles to transfer articles from said nearest conveyor to said receptacles, said last-mentioned article removers including deflectors mounted obliquely across said nearest conveyor and positioned adjacent the upper surface thereof whereby articles will hop thereover and be conveyed to the next receptacle when the previous receptacle is full of articles.

3. A distributing machine for rollable articles comprising a supporting structure, a plurality of parallel conveyors mounted on said structure, a series of article receptacles disposed in succession alongside one of said conveyors, article removers arranged across said conveyors and directed toward said receptacles, certain of said article removers being arranged across the conveyor nearest said article receptacles to transfer articles from said nearest conveyor to said receptacles, said last-mentioned article removers including deflectors mounted obliquely across said nearest conveyor and positioned adjacent the upper surface thereof whereby articles will hop thereover and be conveyed to the next receptacle when the previous receptacle is full of articles, and an article stop disposed across said conveyor at said next receptacle for halting the articles hopping over the article remover at said previous receptacle.

4. A distributing machine for rollable articles comprising a supporting structure, a plurality of parallel endless conveyors mounted on said structure, a series of article receptacles disposed in succession alongside one of said conveyors, a longitudinally extending separator mounted between adjacent conveyors and having gaps therein opposite certain of said receptacles, and article removers arranged obliquely across said conveyors toward said gaps to transfer articles from said conveyors through said gaps to an adjacent conveyor, said receptacles being arranged in groups corresponding to the number of conveyors, one station receptacle in each group having a rod-like article remover positioned adjacent the upper surface of the conveyor to permit articles to hop thereover when the adjacent receptacle is full of articles, and another receptacle in each group having an article stop arranged to halt the articles hopping over the deflector at the previous receptacle.

5. A distributing machine for rollable articles comprising a supporting structure, a plurality of parallel conveyors mounted on said structure, a series of article receptacles disposed in succession alongside one of said conveyors, certain adjoining article receptacles having article passageways extending therebetween adjacent one of said conveyors, article removers arranged across said conveyors and directed toward said receptacles, and an article stop device mounted on and extending across one of said previously mentioned conveyors and in front of one of said passageways for halting the travel of the conveyed articles on said conveyor and collecting the articles thus halted.

6. A distributing machine for rollable articles comprising a supporting structure, a plurality of parallel conveyors mounted on said structure, a series of article receptacles disposed in succession alongside one of said conveyors, article removers arranged across said conveyors and directed toward said receptacles, and an open-sided box-like article stop device mounted on and extending across one of said conveyors for halting the travel of the conveyed articles on said conveyor and collecting the articles thus halted.

CLARENCE PAGE.

REFERENCES CITED

The following references are of record in the file of this patent:

UNITED STATES PATENTS

| Number | Name | Date |
| --- | --- | --- |
| 856,993 | Teague | June 11, 1907 |
| 1,236,391 | Augensen | Aug. 14, 1917 |
| 1,256,294 | Campbell | Feb. 12, 1918 |
| 1,270,501 | Dohm | June 25, 1918 |
| 1,422,229 | Sharp | July 11, 1922 |
| 2,026,200 | Vosler | Dec. 31, 1935 |